US008549280B2

(12) United States Patent
Dagg et al.

(10) Patent No.: US 8,549,280 B2
(45) Date of Patent: Oct. 1, 2013

(54) SYSTEM, DEVICE AND METHOD FOR SECURELY TRANSFERRING DATA ACROSS A NETWORK

(75) Inventors: William Walter Dagg, Vancouver (CA); Barry Michael Grace, Kanata (CA)

(73) Assignee: Compriva Communications Privacy Solutions Inc. (CA)

( * ) Notice: Subject to any disclaimer, the term of this patent is extended or adjusted under 35 U.S.C. 154(b) by 418 days.

(21) Appl. No.: 12/900,844

(22) Filed: Oct. 8, 2010

(65) Prior Publication Data
US 2011/0087877 A1      Apr. 14, 2011

Related U.S. Application Data

(60) Provisional application No. 61/249,782, filed on Oct. 8, 2009.

(51) Int. Cl.
*H04L 29/06* (2006.01)

(52) U.S. Cl.
USPC .............. 713/150; 713/168; 713/189; 726/26

(58) Field of Classification Search
USPC ........................................................ 713/150
See application file for complete search history.

(56) References Cited

U.S. PATENT DOCUMENTS

| | | | |
|---|---|---|---|
| 6,192,407 B1 | 2/2001 | Smith et al. | |
| 6,360,254 B1 * | 3/2002 | Linden et al. | 709/219 |
| 6,529,956 B1 | 3/2003 | Smith et al. | |
| 6,845,387 B1 | 1/2005 | Prestas et al. | |
| 7,490,151 B2 | 2/2009 | Munger et al. | |
| 7,861,090 B2 * | 12/2010 | Kimura | 713/183 |
| 8,028,325 B2 * | 9/2011 | Cahill | 726/2 |
| 2002/0007453 A1 | 1/2002 | Nemovicher | |
| 2002/0029248 A1 | 3/2002 | Cook et al. | |
| 2003/0028600 A1 | 2/2003 | Parker | |
| 2005/0005118 A1 | 1/2005 | Wheeler et al. | |
| 2005/0091277 A1 * | 4/2005 | Desman | 707/104.1 |
| 2007/0005713 A1 | 1/2007 | LeVasseur et al. | |
| 2007/0113101 A1 | 5/2007 | LeVasseur et al. | |
| 2007/0220566 A1 * | 9/2007 | Ahmad-Taylor | 725/89 |
| 2008/0172470 A1 | 7/2008 | Horn | |
| 2010/0083362 A1 * | 4/2010 | Francisco | 726/9 |

OTHER PUBLICATIONS

Jalal et al., "Context and Location-Aware Encryption for Pervasive Computing Environments", IEEE, 2006.*
"How Hushmail Works," Hushmail Communications Canada Inc., 2009.
"A new version of Hush Secure Forms," Hushmail Communications Canada Inc., Jan. 8, 2009.
"Flexcrypt User Manual," Nordic Information Security Group AB, www.flexcrypt.com, Copyright 2008.
"The free and easy online email encryption service," https://lockbin.com, Copyright 2006-2011.

* cited by examiner

*Primary Examiner* — Mohammad L Rahman
(74) *Attorney, Agent, or Firm* — Pillsbury Winthrop Shaw Pittman LLP

(57) ABSTRACT

A method, system, server device and computer program product for securely transferring data from one or more non-subscribers to a subscriber or subscriber-defined destination, via a network, are provided. Access is provided, to one or more non-subscriber, to a network location indicator (NLI) and a private data transfer conduit is established, accessible via the NLI and configured to accept data from the non-subscribers. Data received at the conduit is transformed into secured data and transferred to the subscriber or subscriber-defined destination. In some embodiments, access to the NLI may be provided by accepting a request from a subscriber and sending, upon receipt of the request, a notification to at least one non-subscriber.

27 Claims, 10 Drawing Sheets

SYSTEM, DEVICE AND METHOD FOR SECURELY TRANSFERRING DATA ACROSS A NETWORK

RELATED APPLICATIONS

This application claims priority to application Ser. No. 61/249,782, filed Oct. 8, 2009, which is expressly incorporated by reference herein in its entirety.

FIELD OF THE INVENTION

The present invention pertains to the secure transfer of data across a network from a non-subscriber of a system relating to secure data transfer to a subscriber of such a system.

BACKGROUND

S/MIME-based private email services and SSL/TLS data communication over a network, and other systems that use similar methodologies, are known in the art. Many such systems use a "democratic" model in which all subscribers have similar privileges and/or require a pre-existing registration in order to obtain the necessary keys and/or certificates on either end of a communication. Full functionality (the ability to send and receive digitally-signed and encrypted data, including files, email, streaming video/audio, interactive content or services, VOIP, access to website functions, and other forms of data) requires that both sender and receiver have installed or have access to a digital ID (set of certificates and/or keys) and correctly configured email or interne clients. Users have been reluctant to use such systems since they required installation of a service.

Systems for transferring secure data are helpful for network communication, particularly on distributed networks and network applications, such as, for example, the world wide web, the Internet, LANs (Local Area Network), WANs (Wide Area Network), MANs (Metropolitan Area Network), CANs (Campus or Corporate Area Network), intranets, extranets, and other networks and network applications that would be known to a person skilled in the art. Since most such systems are made up of interconnected networks, sub-networks, and network components, there is ample opportunity for any person or component that has access to the network to be, able to view, copy or otherwise intercept data that was not intended for that person or that component. The ability to transfer secure data over networks provides the security akin to direct communication with the convenience of communicating over ubiquitous pre-existing networks.

Furthermore, many networks employ network communication methods that group data into packets of data of predetermined size. All such data gets grouped into packets irrespective of the content, type or structure of the data. The packets are typically transmitted over the network according to various packet-switching and transmission protocols and are re-assembled at a destination. Data packets are typically communicated over networks and network components that are accessible by others. Each packet takes one of a potentially extremely large possible number of routes from one network location to another network location on its way to its destination, the route in most cases being the one that best fits the requirements for the type of data being transferred. For example, streaming audio or video must arrive at its destination in sufficient time to be placed in the correct order to create a coherent audio or video stream, although most streaming applications provide some buffering time at the end-user to allow for some lag time in transmission. Voice-Over-IP telephone conversations must also be placed in the correct order, but must also reach the destination with virtually no delay to permit both coherent audio transmission and a coherent conversation between participants. Static data, such as data files or emails, need not arrive at the destination in any particular order or within a short period of time. Accordingly, switching protocols permit for packets to take a route that provides the optimal route to the destination as determined by, for example, the underlying data type, and prioritizes certain packets at certain network components or junctions.

Data packets are therefore accessible to a third party with access to the network. Consequently, any third party wishing to view or copy data intended only for a particular recipient need only seek out related packets and assemble them according to pre-existing protocols. Secure data transmission is a means of providing the benefits of network communication while still allowing for the transmission of confidential or secret information.

Many prior systems of securing data for transmission via a network involve creating a secure data channel and/or cryptographic methods to ensure that unauthorized parties either cannot access the data and/or packets at all, or cannot decrypt the data and/or packets, or both. Secure data channels often use cryptographic methodology, but can also provide security by separating the traffic of different users or user communities over an underlying network by providing access to a network via customized or private routing mechanisms. An example of secure data channels includes Virtual Private Networks (or VPN). Secure data channels typically require that all parties to the data transfer have the necessary software, or other special knowledge or access to special data, in order to send or receive the data. Cryptographic methods typically encrypt data before transmission over an existing network and then decrypt after transmission to the end user. Encryption/decryption typically require that both sender and recipient possess or have access to a encryption/decryption algorithm or protocol and/or one or more "keys" or "certificates". The keys are used to "lock" data into an encrypted or secured form and "unlock" the data into an unencrypted or unsecured form. In most known systems, the sender and recipient must both have access to the same key (private) or each must have access to one of a corresponding pair of keys (public/private or private/private).

Known systems, such as public key encryption or PGP require both sender and recipient to subscribe, install, download, or otherwise have access to a common security application or other provider of authentication/security keys or certificates.

Accordingly, there is a need for a system, device, or method of securely transferring data from one party to another wherein both parties need not register with, subscribe to, or download/install a security application or service.

This background information is provided to reveal information believed by the Applicant to be of possible relevance to the present invention. No admission is necessarily intended, nor should be construed, that any of the preceding information constitutes prior art against the present invention.

SUMMARY OF THE INVENTION

An object of the present invention is to provide a system, device and method for securely transferring data across a network. In accordance with an aspect of the present invention, there is provided a method of securely transferring data from one or more non-subscribers to a subscriber or a subscriber-defined destination, communicatively linked by a network, the method comprising: providing access, to at least one of the one or more non-subscribers, to a predetermined network location indicator; establishing a private data transfer conduit accessible via the network location indicator and configured to accept data received from the at least one of the one or more non-subscribers; transforming data received by the private data transfer conduit into secured data; and transferring the secured data via the network to the subscriber or subscriber-defined destination.

In accordance with another aspect of the present invention, there is provided a system for securely transferring information over a network from one or more non-subscribers to a subscriber or subscriber-defined destination, the system comprising: a subscriber computing device communicatively linked to the network; one or more non-subscriber devices communicatively linked to the network; a server module communicatively linked to the network and configured to provide access, to the one or more non-subscribers, to a predetermined network location indicator; a network location corresponding to the predetermined network location indicator; and a private data transfer conduit accessible via the network location indicator; and a processing and server module operatively coupled to the private data transfer conduit and configured to: accept data from the one or more non-subscribers, transform the data into secured data, and transfer the secured data to the subscriber or subscriber-defined destination via the network.

In accordance with another aspect of the present invention, there is provided a server device communicatively linked to a network configured to facilitate secure transfer of information over a network from one or more non-subscribers to a subscriber or subscriber-defined destination, the server device configured to: provide access to at least one of the one or more non-subscribers to a predetermined network location indicator; and establish a private data transfer conduit at a network location corresponding to the network location indicator, the private data transfer conduit configured to accept data from a non-subscriber and transform the data into secured data and transfer the secured data to the subscriber or subscriber-defined destination via the network.

In accordance with another aspect of the present invention, there is provided a computer program product comprising code which, when loaded into memory and executed on a processor of a computing device, is adapted to securely transfer data from one or more non-subscribers to a subscriber or a subscriber-defined destination communicatively linked by a network, including: providing access, to the one or more non-subscribers, to a predetermined network location indicator; establishing a private data transfer conduit accessible via the network location indicator and configured to accept data received from the one or more non-subscribers; transforming data received by the private data transfer conduit into secured data; and transferring the secured data via the network to the subscriber or subscriber-defined destination.

Other objects, advantages and features of the present invention will become more apparent upon reading of the following non-restrictive description of illustrative embodiments thereof, given by way of example only with reference to the accompanying drawings.

DETAILED DESCRIPTION OF THE INVENTION

Definitions

Figure 1:
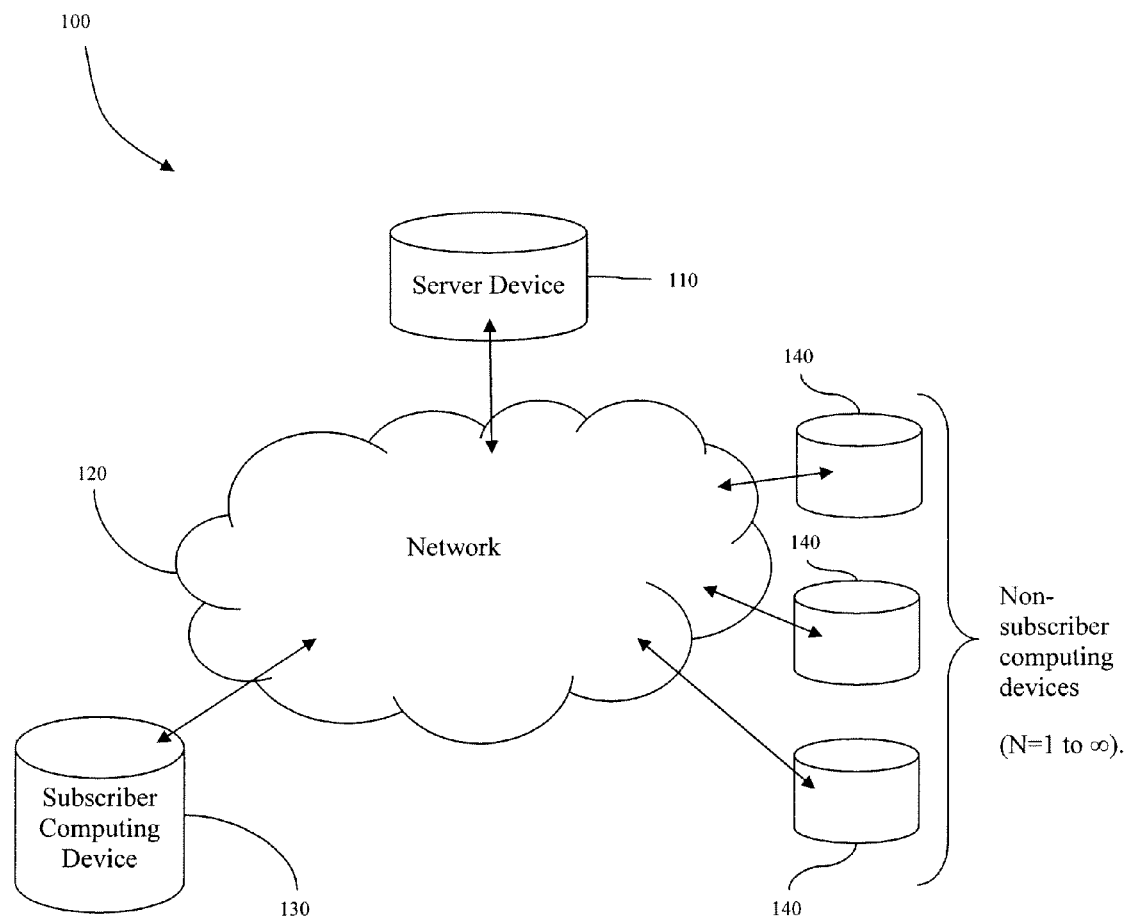
FIG. 1 depicts a high level representative diagram of a system in accordance with embodiments of the instant invention.

The term "network" as used herein refers to network and/or network application, such as, for example, the World Wide Web, the Internet, LANs (Local Area Network), WANs (Wide Area Network), MANs (Metropolitan Area Network), CANs (Campus or Corporate Area Network), SANs (switching area networks), other area networks known in the art, intranets, extranets, and other networks and network applications that would be known to a person skilled in the art. The term may refer broadly to interconnected communication devices and means that facilitate or are configured to facilitate communication between any two or more connected devices via one or more routes over the interconnected devices and means. It may also refer to network applications, interconnected network resources, and interconnected network services, which may or may not reside on network infrastructure, including but not limited to the World Wide Web. Accordingly, as used herein it may refer to both the physical and virtual infrastructure of a network, including interconnected computing devices, networking devices, communication media (e.g., wires, cables, wireless connections, etc.), networks and sub-networks, as well as the information and resources that are transferred via said physical and virtual infrastructure.

The term "network location" as used herein, refers to a resource or location on a network. It may refer to a physical or virtual component or device on a network, or it may refer to a document, resource, or other data. It may refer to static resources and documents that are stored within a network component, such as, for example, a web page on a web server. It may also refer to dynamic resources that are in whole or in part created upon an access or other request made by a network user. It may also refer to a resource, document, or data that is created by client-side scripting (or other similar functionality known in the art) to change appearance, functionality or other aspect of a resource, document or data at a user's computing device or one or more intermediate network components.

The term "network location indicator" as used herein, refers to any identifier or indicator relating to a resource or location on a network. The network location indicator may include a means to identify a resource or location, a means to name a resource or location on a network, or a means to indicate an address or location of a resource or location. The network location indicator may include but is not limited to Uniform Resource Identifiers (URI), typically used to identify or name a resource on the Internet or other networks. Network location indicators may also include Uniform Resource Locators (URL), which are akin to an address or an indication of location of a resource or of a location on a network, or a Uniform Resource Names (URN), which are akin to a name of a resource or of location on a network. Other examples include dereferenceable URIs, URI references, absolute URIs, Persistent URLs (PURLs), and other such identifiers using specific protocols typically used on the Internet and similar networks. Other types of indicators or identifiers as would be known by a person skilled in the art may be used. In general, an identifier or indicator that relates the identity of a network resource or network location, names a network resource or network location, provides a pseudonym for a network resource or network location, or provides an address or location for a network resource or network location. In some contexts, the term network location indicator may refer to the network location.

The term "transform" as referred to herein is a process that in general changes unsecured data into secured data and vice versa. Transform can be used to define one or more of encryption, decryption, packetization, compression, decompression and the like. It may also include transforming data such that it can be separated from other traffic on a network such that only designated parties, or parties possessing some special knowledge or ability, may access the separated or secured data. In cases where transformation relates to encryption/decryption, it can include the process of transforming data, sometimes referred to as plaintext, using an algorithm, sometimes referred to as a cipher, to make the data unreadable or inaccessible to another party except those possessing the special knowledge or ability to reverse the transformation. The special knowledge or ability may refer to a key or certificate comprising a key. In some cases, the same key is used for encryption and decryption, which requires that the same key be private to all but the parties to the communication. In some cases, a private key is kept by the party receiving the communication and no other party, and a corresponding public key is distributed freely to any party wishing to send data to the receiving party. In some cases, the public key transforms into secure data and the corresponding private key will transform the same secured data into unsecured data. Commonly used algorithms for public/private key encryption include the D-H, RSA, and DSA algorithms. Transformation may also refer to transformations of data that separate designated portions of data from other data travelling on a network, or make the data suitable for transfer across a separate network structure (whether actual or virtual). A non-limiting example of such a transformation includes transformations that may be used for transferring private, confidential, or otherwise sensitive data across a Virtual Private Network, or by otherwise separating data traffic of different user communities over an underlying network with security features, or to provide access to a network via customized or private routing mechanisms. Other transformation processes will be known to persons skilled in the art.

The term "private data transfer conduit" as used herein relates to a communication path from one network resource or location to another network resource or location that is secure, protected or private from any party that is not an intended recipient of the information. As used herein, the term may refer to the route or path that the information takes, including the networks, network applications (e.g., World Wide Web), network locations, network components (whether actual or virtual), and network location indicators over which the data is transferred, or it may refer to the initial, starting, or sending network resource or network location. It may also be used to refer to the destination or destinations of the transfer, including the receiving network resource or network location. The meaning of the word "conduit" is not intended to be restricted herein to data transmissions, or portions thereof, that follow the same path or route, as would be understood a person skilled in the art of network communications, especially networks that employ packetization or packet-switching methodologies of data transfer, such as the Internet. "Conduit" refers generally to the notion that there is one or more entry points for data, whereupon data is transformed into secured data that is unreadable or inaccessible to a party (including in some cases the parties to the data transfer itself) and one or more exit points whereupon the secured data is transformed into unsecured data and readable or accessible. The term may refer to a means of data transfer that includes encryption, secure data channels, packetization, compression, or other means of transforming data into secure data from one or more network locations (including actual and virtual network devices or computing devices) to any one or more other network locations.

The term "key" as used herein refers to data that facilitates the functional output of a cryptographic algorithm or cipher. A key may specify the particular transformation of secure data into unsecured data, or vice versa. A key may also be used in other cryptographic algorithms, such as digital signature schemes and data non-repudiation. A key is generally used, along with a cryptographic algorithm (such as D-H, RSA, DSA or other algorithms known to persons skilled in the art), to transform data into encrypted or otherwise secure data. The same key may be used to transform the same secure data back into the original unsecure data by decryption or other transformation referred to herein and known to a person skilled in the art. A different key, which corresponds to the first key used to transform the data into secure data, may also be used to decrypt or transform the secure data into the original unsecure data (e.g., public-private or private-private key pairs).

The term "certificate" as used herein refers to data which uses a digital signature to bind together a key or keys with an identity, including information such as the name of a person or an organization, their address, and/or other identifying characteristics. The certificate can be used to verify that a key is associated with a particular party and that secured data has not been unsecured or tampered with. Certificates typically comprise a key, identifying data relating to a party or parties, a digital signature and digital signature algorithm, an issuer (including, for example, a trusted third party, certificate authority, or an application for sending private or confidential data), and a hash and hash algorithm. The hash, which may also be referred to as a thumbprint, is data that serves to assess whether secured data associated with a certificate has been viewed or changed.

The term "non-repudiation" as used herein refers to the concept of ensuring that a party cannot repudiate, or refute the validity or source of data, whether secured or unsecured. The concept can be applied to data transmission, as well as in the verification and trust of signatures, digital or otherwise. In general, "non-repudiation" may refer to: a service that provides proof of integrity and origin of data or data transfer; or authentication of data that may be asserted with a high degree of certainty.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

General Overview

The methods, devices and systems for securely transferring data described hereinbelow provide for transferring secure data wherein only one of the parties to the data transfer subscribes, installs, downloads, or otherwise has access to, a security application or other provider of authentication data such as keys or certificates. In some embodiments of the methods, systems and devices described herein, there is provided a means of sending from a subscriber to a non-subscriber a private data transfer request that, inter alia, provides a network location indicator that the non-subscriber may use to transform data into secure data and transfer same to the subscriber. In another embodiment, the subscriber may make available to one or more non-subscribers on one or more network locations comprising means for sending to the subscriber secure data over a network, including public, private and semi-private networks.

One embodiment of the instantly disclosed invention permits a non-subscriber to securely transmit or upload data, including text information, data files, streaming audio or video, VOIP data, or any other data capable of being transferred over a network, to an "inviting" subscriber or a subscriber-defined destination. The non-subscriber does not require additional software, or registration to any other software, service or resource to secure the data being transferred.

In another embodiment, an "inviting" subscriber creates a private data transfer notification, that includes a network location indicator, by accessing a network location comprising means for data entry, such as a webform, entering therein identifying or address information, such as an email address, and optionally other information, such as a note to the non-subscriber, and then sending the private data transfer notification to the one or more non-subscribers. The party to whom the private data transfer notification is addressed (i.e., the non-subscriber) opens the received private data transfer notification, accesses the included network location indicator and is thereby directed to a unique network location on a secure server that comprises an entry point for a private data transfer conduit, which may further comprise means for data entry, such as a webform. The private data transfer conduit can be used by the non-subscriber to send a secure message and/or files, or other data to the inviting subscriber or some other destination, such as a computing device or other network component, location or resource, as defined by the subscriber.

In some embodiments of the instant invention, an "inviting" subscriber places the "invitation" on a pre-determined network location, such as his or her website. A visitor to the subscriber's website clicks on the "invitation" to be directed to a unique network location indicator or network location on a secure server that comprises an entry point for a private data transfer conduit, which may further comprise means for data entry, such as a webform. The private data transfer conduit can only be used to send a secure message and/or files, or other data to the inviting subscriber. In some embodiments, the "invitation" itself may comprise an entry point for a private data transfer conduit, which may further include means for data entry, such as a webform.

In one embodiment of the present invention, there is provided a method of securely transferring data from one or more non-subscribers to a subscriber or a subscriber-defined destination communicatively linked by a network. The method comprises the steps of receiving a private data transfer conduit request from the subscriber, the private data transfer conduit request comprising information relating to the one or more non-subscribers; sending a private data transfer conduit notification to the one or more non-subscribers, the private data transfer conduit notification comprising a network location indicator; establishing a private data transfer conduit accessible via the network location indicator and configured to accept data received from the one or more non-subscribers; transforming data received by the private data transfer conduit into secured data; and transferring the secured data via the network to the subscriber. In some embodiments, this method is preceded by the step of authenticating the private data conduit request and other information being received from the subscriber. In other embodiments, the subscriber establishes or otherwise makes available a network location, or a network location indicator thereto, that comprises a private data transfer conduit.

In another embodiment, there is provided a system for securely transferring information over a network from one or more non-subscribers to a subscriber or a subscriber-defined destination. The system comprises a server device and one or more computing devices communicatively linked by a network. The server device is configured to accept a private data transfer conduit request from the subscriber, or computing device associated with the subscriber, comprising information relating to the non-subscriber; upon receipt of said private data transfer conduit request, the server device is configured to send a private data transfer conduit notification to a non-subscriber that comprises a network location indicator and establish a private data transfer conduit at the indicated network location, the private data transfer conduit configured to accept data from one or more non-subscribers and transform the data into secured data and transfer the secured data to the subscriber via the network. In some embodiments, the system is configured to authenticate the request and other information being received from the subscriber. In other embodiments, the subscriber may establish or otherwise make available a network location, or a network location indicator thereto, that comprises a private data transfer conduit.

In another embodiment, there is provided a server device for securely transferring information over a network from one or more non-subscribers to a subscriber. The server device is configured to accept a private data transfer conduit request from a subscriber comprising information relating to the non-subscriber; upon receipt of said private data transfer conduit request, the server device is configured to send a private data transfer conduit notification to a non-subscriber that comprises a network location indicator and establish a private data transfer conduit at the indicated network location, the private data transfer conduit configured to accept data from one or more non-subscribers and transform the data into secured data and transfer it to the subscriber via the network. In some embodiments, the server device is configured to authenticate the request and other information being received from the subscriber. In other embodiments, the server device is configured to allow a subscriber to establish or otherwise make available a network location, or a network location indicator thereto, that comprises a private data transfer conduit.

With reference to FIG. 1, the system for securely transferring data, generally referred to using the numeral 100 and in accordance with one embodiment of the present invention, comprises a server device 110, a network 120, a subscriber or subscriber computing device 130, and one or more non-subscribers or non-subscriber computing devices 140. The server device 110 is communicatively connected to the network and is configured to accept a private data transfer conduit request from a subscriber or subscriber computing device and, optionally, authenticate the subscriber and/or provide a non-repudiation service relating to the request. Non-repudiation with respect to data, including the request, includes the provision of proof of the integrity and origin of that data, and/or authentication that the request can be asserted to be genuine.

In some embodiments, the system 100 includes a subscriber computing device 130, which is configured to allow a subscriber to specify a non-subscriber, provide certain information relating to the non-subscriber, and submit a request for establishing a private data transfer conduit for receiving data from the non-subscriber. The specification of a non-subscriber, the information relating thereto, and the request may be input into the subscriber computer or an application running or executed thereon and then sent to the server device via the network (i.e., client-side). Alternatively, the subscriber may access a web site or other network location that has been established by the server device and input the information there (i.e., server-side). Other variations in this respect are possible, as would be understood by a person skilled in the art. The subscriber computing device 130 is often also the destination of the private data transfer conduit, which may in some embodiments transform the secure data into unsecure (or readable/meaningful) data. In some embodiments, the subscriber may designate another network location or component (including another computing device) as a destination point for the private data transfer conduit.

Some embodiments of the system 100 also include one or more non-subscriber computing devices 140. Non-subscriber computing devices are configured to accept a notification relating to a private data transfer conduit. The notification comprises a network location indicator that may be used by the non-subscriber on a non-subscriber computing device to access a private data transfer conduit for securely transferring data to the subscriber via the network.

Server Device

Figure 2:
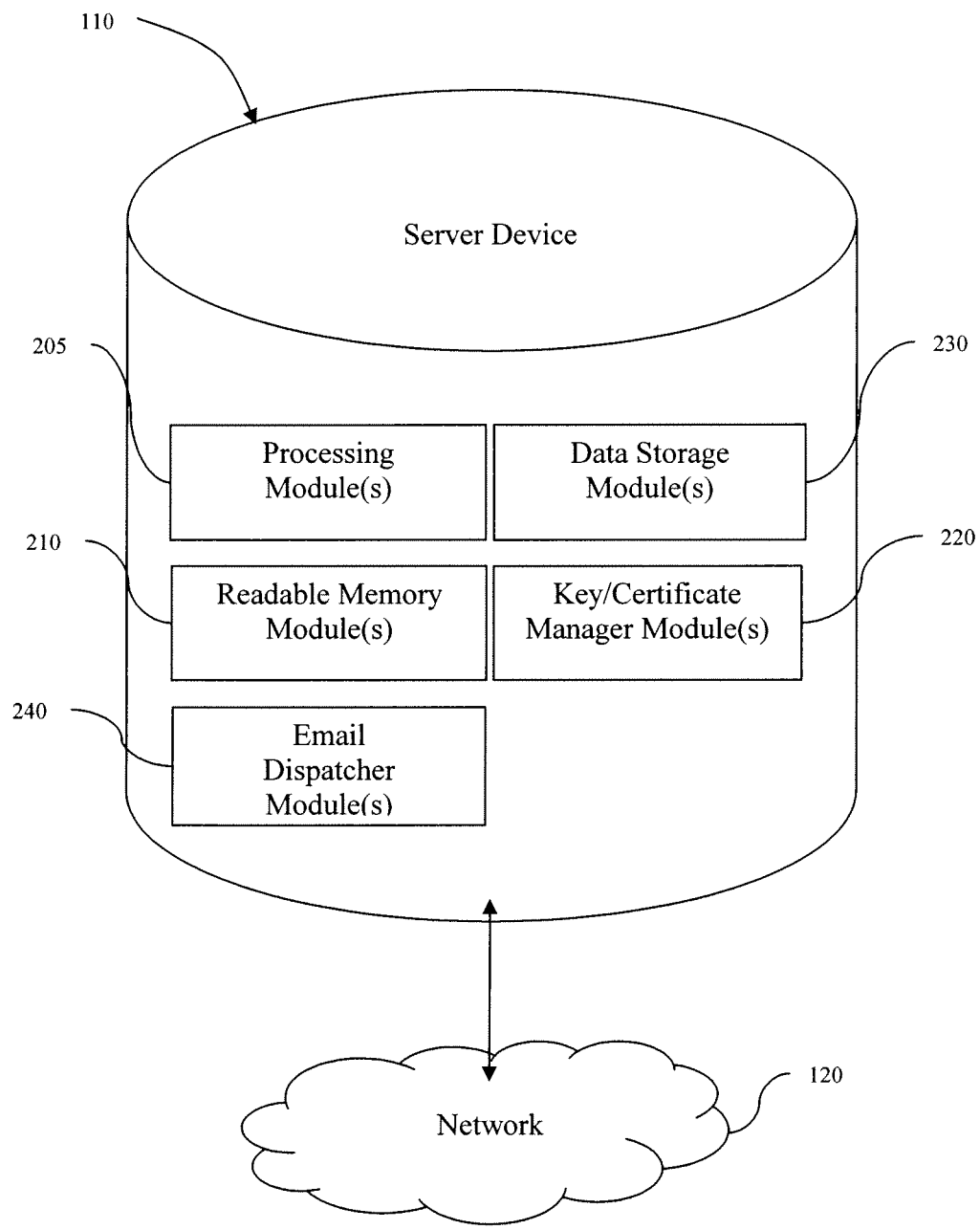
FIG. 2 depicts a server device in accordance with embodiments of the instant invention.

With reference to FIG. 2, some embodiments of the invention comprise a server device 110. The server device may comprise or have communicative access to a number of modules, including processor modules 205, memory modules 210 having instructions recorded thereon, certificate or key manager modules 220, data storage modules 230, and email dispatcher modules 240. The server device and the modules may be integral or modular/separate components that are communicatively connected locally or disparately via the network 120 or other network or communicative means known to persons skilled in the art. They may also be a combination thereof. The server device and its modules are collectively configured to receive a private data transfer conduit request from a subscriber, the request comprising information relating to one or more non-subscribers. Optionally, the server device may require and/or use additional information accompanying the request to authenticate the identity of the requesting subscriber and provide non-repudiation of the request and accompanying information. Upon receipt of the request, the server device sends a private data transfer conduit notification to each of the one or more non-subscribers specified in the request. The notification comprises a unique network location indicator generated by the server device. The server device further establishes one or more locations on the network for private data transfer conduits, accessible according to the one or more unique network location indicators. The one or more private data transfer conduits are configured to receive data from each of the non-subscribers and transform the data into secure data. The secure data is transferred to the subscriber via the private data transfer conduit. Optionally, the secure data may be transformed from secure data back to the original data upon arriving at the subscriber computing device. There may be unique network locations and corresponding network location indicators, as well as unique private data transfer conduits for each of the one or more non-subscribers. Alternatively, some or all of the one or more non-subscribers may share private data transfer conduits and/or network locations thereof.

In some embodiments, the server device is configured to, inter alia, perform the following functions, either by doing so itself or by one of its modules, or by providing instructions to another network component which performs the function(s):

accept a private data transfer request from a subscriber;

optionally generate a network location accessible only to subscribers and configured to facilitate the generation of private data transfer requests by accepting data from the subscriber, including but not limited to the identity and address or location of the one or more non-subscribers (from whom the subscriber wishes to receive securely transferred data);

optionally authenticate the subscriber and the integrity of the request;

generate a network location and the associated network location indicator generate a private data transfer notification comprising a network location indicator;

generate a private data transfer conduit that is accessible at the network location, the private data transfer conduit configured to accept, transform and transfer data;

generate, store and otherwise manage certificates and keys relating any certificates or keys which may be used by various embodiments of the invention, including but not limited to data received from a non-subscriber that has been transformed according to TLS/SSL or other transformation; and to data that is transferred into and by the private data transfer conduit according to transformation methodologies and/or protocols in accordance with the instant invention, including by using private and/or public certificates and keys generated by the methods, systems and devices disclosed herein;

generate or identify, by for example contacting the subscriber computing device or by querying a database containing the relevant information, one or more network locations, resources or components, and/or real or virtual computing devices being communicatively linked to the network, as a subscriber-defined location for receiving secured data via the private data transfer conduit; and send the private data transfer notification to the one or more non-subscribers or non-subscriber computing devices.

The processing modules 205 comprise components required for processing information and causing the server device to carry out the functionality as described herein, including processing instructions, handling communications, and processing and generating information, as well as other functions required for data transformation, network communication, and data processing as would be understood to be necessary by a person skilled in the art.

The memory modules 210 comprise one or more computer-readable and/or writeable storage media, which contains instructions thereupon to provide functionality of the server device as described herein.

In some embodiments of the instant invention, there is provided key or certificate manager modules 220 which are capable of key or certificate generation, storage, authentication, verification, and provision, as well as any other functionality relating to key or certificate management that would be known to a person skilled in the art, including but not limited to digital signature and signature algorithm generation, hash and hash algorithm generation and assessment. In some embodiments, a single private key is generated that is capable of being used for both transforming from unsecured data into secured data, and vice versa. In other embodiments, private and public key pairs can be used, wherein a public key is used to transform data into secure data and the subscriber's private key is used to transform the same secure data back into the original unsecure data. The key or certificate manager module may in some embodiments provide either or both of private certificates and private/public certificate pairs. Certificates may serve to authenticate both the party sending information and the associated key. They also may provide non-repudiation services relating to data sent by a subscriber, the server device, or non-subscriber during any functions of the server or methods described herein. The key or certificate manager modules 220 can also obtain and manage keys and/or certificates relating to TLS/SSL (or other standard or protocol-based security/encryption data transmission methods) by, for example, providing a non-subscriber with the necessary public key or certificate to enable secure data transfer from the non-subscriber's computer (or accessed network location) to the network location generated by the server device and comprising the access point to the private data transfer conduit.

The data storage modules 230 may contain, inter alia, information relating to subscribers and other data relating to the creation of network locations, such as for example, graphical user interface data for web forms and web sites, as well as other data necessary for the infrastructure and logistical support thereof.

The server device of certain embodiments may comprise one or more email dispatcher modules 240, which may facilitate the creation and packaging of the data that is to be securely transferred with a subscriber's public key or certificate. The email dispatcher modules, in some embodiments, may facilitate the creation of the private data transfer conduit at the network location.

In another embodiment, one or more network locations are established or made available by the server device 110 without a specific request by a subscriber. The network locations, or network location indicators thereto, are made available to non-subscribers, such as by, for example, providing access to a generated network location indicator for a network location comprising the private data transfer conduit, or alternatively direct access to the private data transfer conduit. Access may be provided by communicating to the non-subscriber information relating to the network location indicator by, for example an email message, or by placing the network location indicator on another network location that is accessible to the non-subscriber, such as for example a Web site. The non-subscriber can specify a subscriber at the network location either by providing identifying information or by selecting from a predetermined and read-only list of available subscribers. The network locations also comprise a private data transfer conduit for accepting data from a non-subscriber, transforming data into secured data, and transferring the data to the subscriber. The private data transfer conduit is configured to receive data from each of the non-subscribers and transform the data into secured data.

Various Transformations

In one embodiment, communication from the non-subscriber to the network location comprising the private data transfer conduit uses cryptographic protocols used on existing networks, including for example, Transport Layer Security (TLS) and Secure Sockets Layer (SSL) for security and data integrity for communications over networks such as the Internet, and S/MIME for security and data integrity for email communications. As would be understood by a person skilled in the art, cryptographic methods may use a public key infrastructure using RSA encryption (or other encryption algorithms known to persons skilled in the art) and private/public key or certificate pairs issued by a third party certificate provider or certificate authority. In accordance with such methods, in one embodiment of the instant invention, data being transferred by the non-subscriber over a network is preceded by standard "handshake" techniques between client and server. Such handshake techniques typically involve negotiation and agreement over encryption methods and algorithms and a transfer of a public key or a public certificate (that usually comprises a public key, in addition to other authenticating information). The public key or certificate may be used to transform data into secure data, but not vice versa. Only the private key or certificate corresponding to the public key or certificate can transform secured data into unsecured data.

In one embodiment, secured data is transferred from the non-subscriber to the server-generated network location, or the server itself, via existing networks using cryptographic protocols available on most existing networks (e.g., SSL/TLS, S/MIME) and the secure data is transformed back to unsecure data at said network location or server device. In such embodiments, a network location or server device may comprise functionality to obtain a public key or certificate relating to a private key or certificate uniquely associated to a subscriber and generated or assigned according the subscriber's subscription or registration to or with the server device, or software stored on or otherwise relating thereto. The public key or certificate can be obtained from the key or certificate manager module, the subscriber, or the data storage module. Using the system assigned public key or certificate (as opposed to the third party assigned public key or certificate, and associated transformation algorithms and methods), the unsecure data is transformed into secure data at the private data transfer conduit located at the predetermined network location. The secured data is transferred via the private data transfer conduit to the subscriber, where the secured data may, in some embodiments, be transformed into unsecured data using the corresponding private key or certificate that is unique to the subscriber and not assigned by a third party certificate provider or authority and using proprietary transformation algorithms specific to the system. The corresponding private key may be generated on the subscriber system in accordance with key/certificate generation methodologies and characteristics related to the system, by some related third party application or source (such as a trusted third party service established beforehand by the system or subscriber, or devices such as security tokens or key fobs that store or generate private keys or certificates), or transferred in a secure fashion by the system to the subscriber system. When generated on the subscriber system, the private key or certificate may be generated at the time the system is installed or accessed by the subscriber system, or at some later point before data transfer, at which time the associated public key or certificate may also be transmitted to the key or certificate manager module. This aspect of the embodiment of this invention could be in embodiments in which a network location indicator is transferred to a non-subscriber by way of a notification following a request from a subscriber, or in embodiments when the subscriber makes the network location or corresponding network location indicator available to some or all non-subscribers.

In some embodiments, data from the non-subscriber to the network location comprising the private data transfer conduit may be transferred according to standard and otherwise available encryption protocols, such as SSL/TLS or S/MIME. In such embodiments, the network location comprising the private data transfer conduit is generated by, inter alia, using a private/public key or certificate from a certificate authority obtained by the server device upon generation of the network location or having been previously obtained for use in accordance with SSL/TLS data transfer (or other similar methodologies or protocols known in the art). In such embodiments, this is to provide secure data transfer from the non-subscriber's computing device to the private data network conduit, whereupon the data is transformed into secure data in accordance with the instant invention and, if necessary, by public/private keys or certificates generated by the server device or its modules, the network location or resource, or the private data transfer conduit.

Alternative Methods, Systems and Devices

Figure 3:
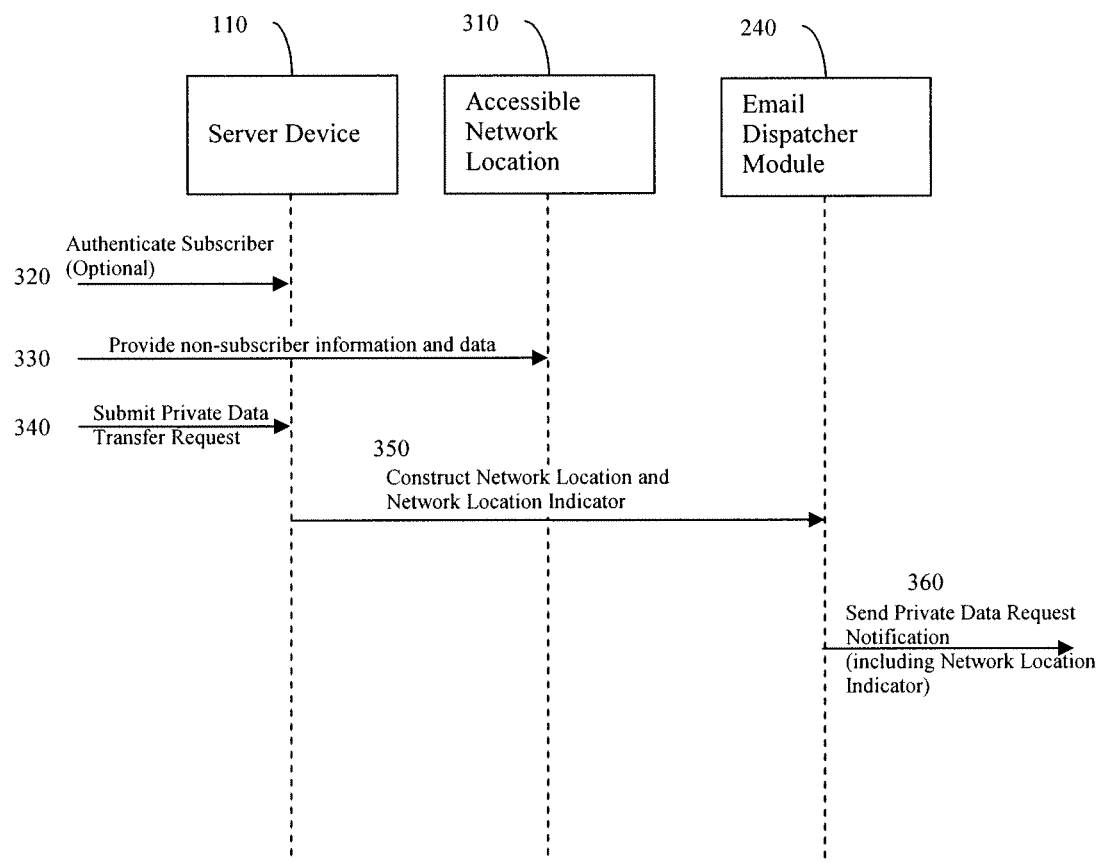
FIG. 3 depicts a sequence diagram representative of a method for securely transferring data across a network in accordance with one embodiment of the instant invention.
Figure 5:
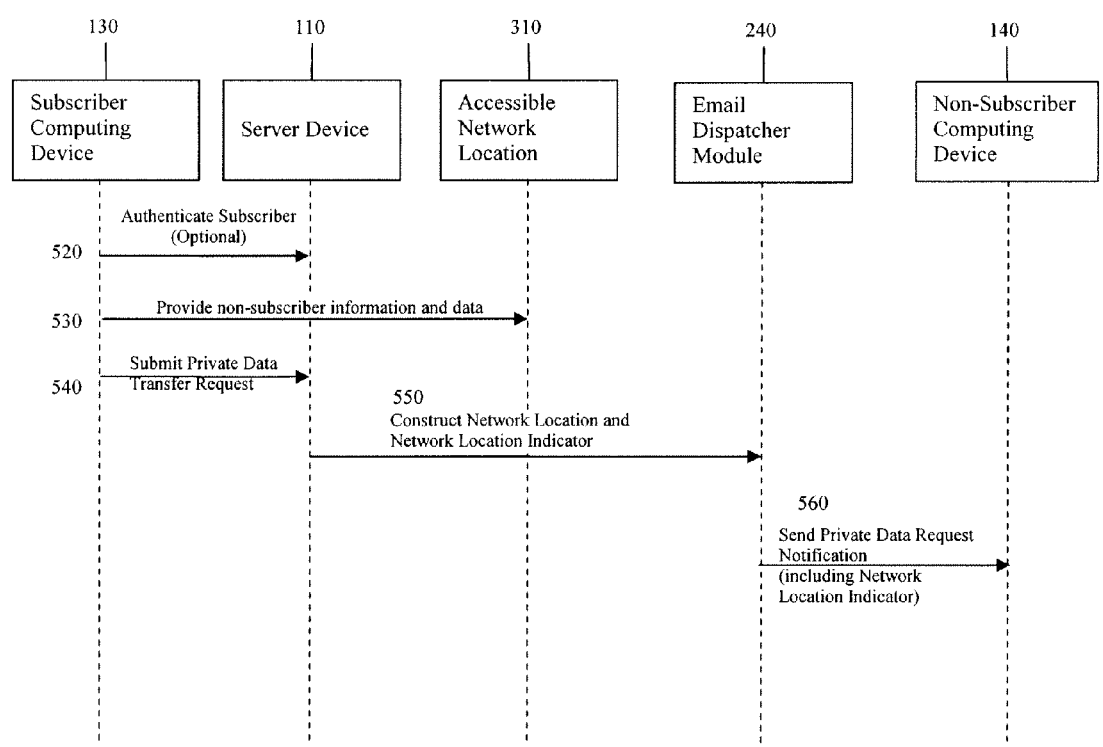
FIG. 5 depicts a sequence diagram representative of a method for securely transferring data across a network and various components of a system in accordance with embodiments of the instant invention.

With reference to FIGS. 3 and 5, there is provided in accordance with another embodiment of the instant invention a method of securely transferring data from one or more non-subscribers to a subscriber or a subscriber-defined destination communicatively linked by a network. The method comprises optionally assessing data received from a subscriber in order to authenticate 320, 520 the identity of the subscriber and provide non-repudiation of the data, receiving a private data transfer request from the subscriber 340, 540, the private data transfer request comprising information relating to the one or more non-subscribers 330, 530 from whom the subscriber wishes to receive securely transferred data and optionally further information such as a note, sending a private data transfer request notification to the non-subscriber, the request comprising a network location indicator. The network location indicator may be, for example, a unique URL that is generated by the system or system components 350, 550 that links the non-subscriber to a network location, such as a web site comprising a web form, into which the non-subscriber can input data intended to be transformed into secure data and transferred to the subscriber. A private data conduit accessible at the network location that is identified by the network location indicator found in the private data transfer request notification is established. The private data conduit is configured to accept data from the one or more non-subscribers, transform the data into secured data, and transfer the secured data via the private data conduit to the subscriber.

In another embodiment, there is provided a method of securely transferring data that involves a non-subscriber visiting or using a network location, specifying or being able to specify a recipient of secure data that is a subscriber, providing data that is intended to be transformed into secure data and transferred to the specified subscriber, submitting or having the capability to submit a request for the secure transfer of the data to the subscriber. Upon receipt of the request, and the data, a server device locates the public key or certificate that is associated to the specified subscriber and was created by virtue of the subscriber subscribing to, or otherwise registering with, joining, and/or installing or running an application relating to, the systems and devices disclosed herein. The server device, the network location, and/or the email dispatcher module of the server device, are configured to use the public key or certificate, obtained from the certificate or key manager module, to transform the data into secure data and transfer same to the subscriber recipient. In some embodiments, the data is secured by transforming it, not by use of encryption techniques, but rather into data that is suitable for secure transfer across a network such that the data is not accessible to other users of the network. Such as, for example, across networks where certain portions of network traffic has been separated or designated for private or restricted use. This may include secure data channels that separate the traffic of different users or user communities on an underlying network by providing access to a network via customized or private routing mechanisms.

Figure 4:
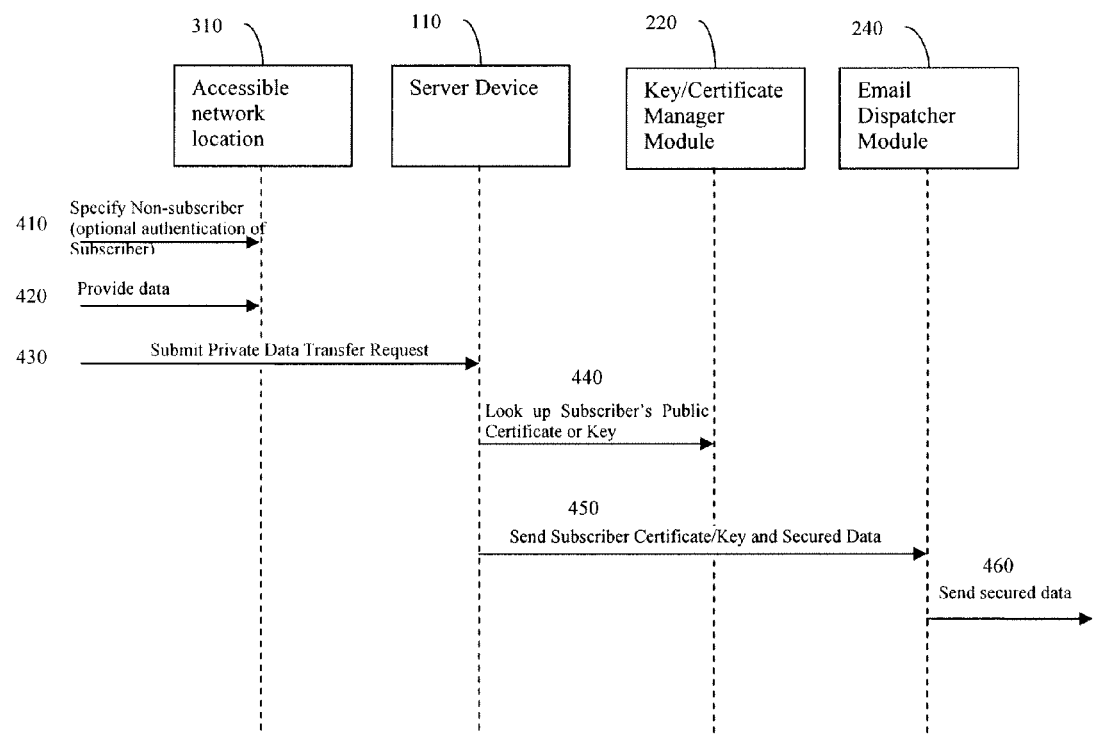
FIG. 4 depicts a sequence diagram representative of a method for securely transferring data across a network in accordance with another embodiment of the instant invention.
Figure 6:
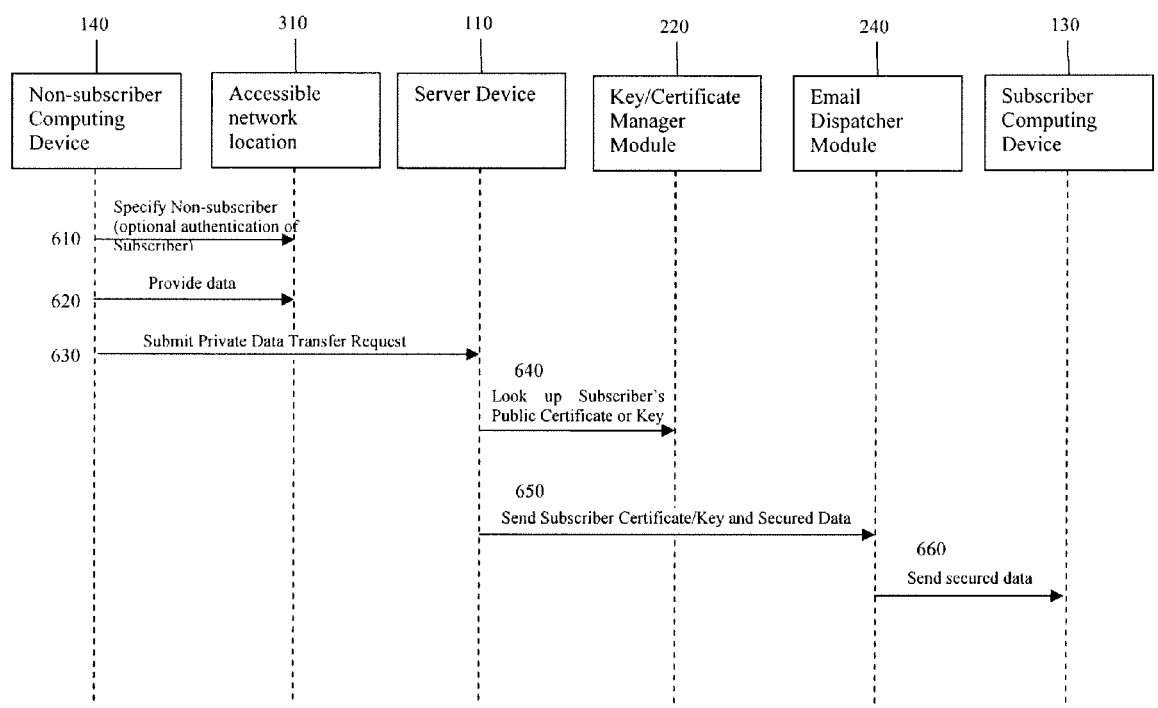
FIG. 6 depicts a sequence diagram representative of a method for securely transferring data across a network and various components of a system in accordance with other embodiments of the instant invention.

With reference to FIGS. 4 and 6, there is provided a method whereby there is established a network location accessible to non-subscribers on a network that provides a private data transfer conduit to the non-subscriber. The private data transfer conduit is configured to securely transfer data from the non-subscriber to the subscriber. The method comprises the steps of, optionally, accepting information in which the subscriber is specified 410, 610, data is provided 420, 620 at the private data transfer conduit, along with in some embodiments a private data transfer request 430, 630 for the server device 110, the data is transformed into secured data, optionally by accessing a public key or certificate 440, 640 that is associated with the private key or certificate of the subscriber and using said public key or certificate to encrypt the data 450, 650, and sending public key or certificate and secured data to the subscriber 460, 660. The method may, optionally, include the step of transforming the secured data back into unsecured data by, for example, using the private key possessed only by the subscriber and corresponding to the public key used to transform the data into secured data.

Confirmation Methods

In some embodiments, confirmation indications or messages may be sent to the non-subscriber that was identified as being the sender of the data to the subscriber in order to confirm the sending of secured data via a private data transfer conduit. Such confirmation messages would be sent when data is transformed into secure data and transferred at the private data transfer conduit, and/or when the secure data is received by the subscriber. The confirmation messages would assist in guarding against or detecting an unauthorized sender that has assumed the identity of or appears to be a particular non-subscriber. In some embodiments, the confirmation email comprises data indicating the time and subject of the data sent via the private data transfer conduit and may be sent to the non-subscriber, alerting the non-subscriber to unauthorized use or data transfer.

Limiting Non-Subscribers

In some embodiments, there is little or no restriction on the persons or entities who may be a non-subscriber, and thus capable of securely transferring data to a subscriber, except insofar as the non-subscriber must have access to the network upon which the system and/or server devices are communicatively connected. In other embodiments, only those non-subscribers belonging to a predetermined class can securely transfer data according to the various embodiments of the instant invention. The class of non-subscribers can be constituted in any way, including for example, membership to a social or other type of group (including, for example, family, business, affiliation, or by virtue of any other form of pre-existing relationship) or access to a particular network, sub-network or network resource (virtual or otherwise). In yet other embodiments, only pre-determined non-subscribers may securely transfer data according the instant invention. The pre-determined non-subscribers may be limited by, for example, creating a list or determination of permitted non-subscribers or attributes of non-subscribers on or accessible by the server device.

Subscribers and Non-Subscribers

In general, the systems, devices and methods described herein allow a non-subscriber to securely transfer data via networks that are accessible to third parties (indeed the public at large when the network is the Internet) to a subscriber or to a destination defined by said subscriber. As used herein a subscriber may be a party who, for the purposes of a particular data transfer, has subscribed or registered with or to the system, or has downloaded or installed an application, software, or other modalities of functionality related to said system that would be known to a person skilled in the art, onto a device to be used for communicating over a network. A non-subscriber may be conversely a party who, for the purposes of a particular data transfer, has not subscribed or registered with or to the system, or has downloaded or installed an application, software, and/or other modalities of functionality related to said system that would be known to a person skilled in the art, onto a device to be used for communicating over a network.

As such, a subscriber may in some embodiments have previously generated or transferred to them a private key or certificate that can be combined with the same private key known to the appropriate server device. In other embodiments, the private key may only be known to the subscriber and the server device has, or has access to, the corresponding public key. A non-subscriber need not have access to such keys or certificates. The non-subscriber does not require proprietary software, keys, or certificates relating to the system and is not required to register for a service relating to the system, except in some embodiments to have installed on the subscriber computing device commercially available applications (e.g. Windows Internet Explorer™) that provide for secure communication according to standard Internet protocols (e.g. SSL/TLS) and is thus capable of accepting a public key used for transforming data into a secure form in accordance with such protocols. The non-subscriber may, in some embodiments, require a valid email address and a standard web browser that supports 128-bit SSL or TLS encryption as would be commonly used in most commercial web browsers available and in wide spread use.

The terms subscriber and non-subscriber are to be understood in the context of a particular data transfer or communication. For example, a user may be registered with a server that is in accordance with the present invention, and thus capable of receiving secured data from non-subscribers. If such a registered user, however, accessed a private data transfer conduit to send to another subscriber, either by way of widely available network location (i.e., a web form on a web site), or by way of a network location indicator sent by a private data transfer request notification, that user would for the purposes of such a data transfer be considered a non-subscriber. It is therefore possible for a party to be a subscriber in the context of one secure transfer of data, and be a non-subscriber in the context of another secure transfer of data.

Data

In some embodiments, the data being securely transferred may be an email message from a non-subscriber to a subscriber. In other embodiments, the data may comprise another form of data or information capable of being represented digitally. It can also comprise files, streaming data, or VOIP. Accordingly, the systems, devices, and methods disclosed herein are configured to send emails, text, documents, files, video, audio, streaming media, VOIP data, or other form of digital information from a non-subscriber to a subscriber or a subscriber-defined destination.

Authentication

In some embodiments, there is a step of authenticating a subscriber making a private data transfer request. Authentication includes means or methods that provide proof that the user making the request is in fact the subscriber authorized to do so, proof of integrity and origin of data, and an authentication of the identity of the requestor with high assurance that can be asserted to be genuine. It therefore includes, in some embodiments, non-repudiation of messages that appear to originate from a particular subscriber.

Authentication may employ methods for assessing the origin of the data, as well as the identity of the user, including digital signatures and digital signature algorithms. Such methods are intended to ensure that data that purports to be coming from a particular user can be verified with a high degree of certainty as in fact coming from that user. It may also employ techniques known to a worker in skilled in the art for assessing the integrity of data, specifically, whether the data has been viewed, copied or altered in some way. An example of assessing integrity of data, or providing non-repudiation services, may include functionality relating to hashes and hash algorithms or functions.

Computer Program Product

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

EXAMPLES

The invention will now be described with reference to specific examples. It will be understood that the following examples are intended to describe embodiments of the invention and are not intended to limit the invention in any way.

Example 1

Compriva Private Note "Quicklink"

Figure 7:
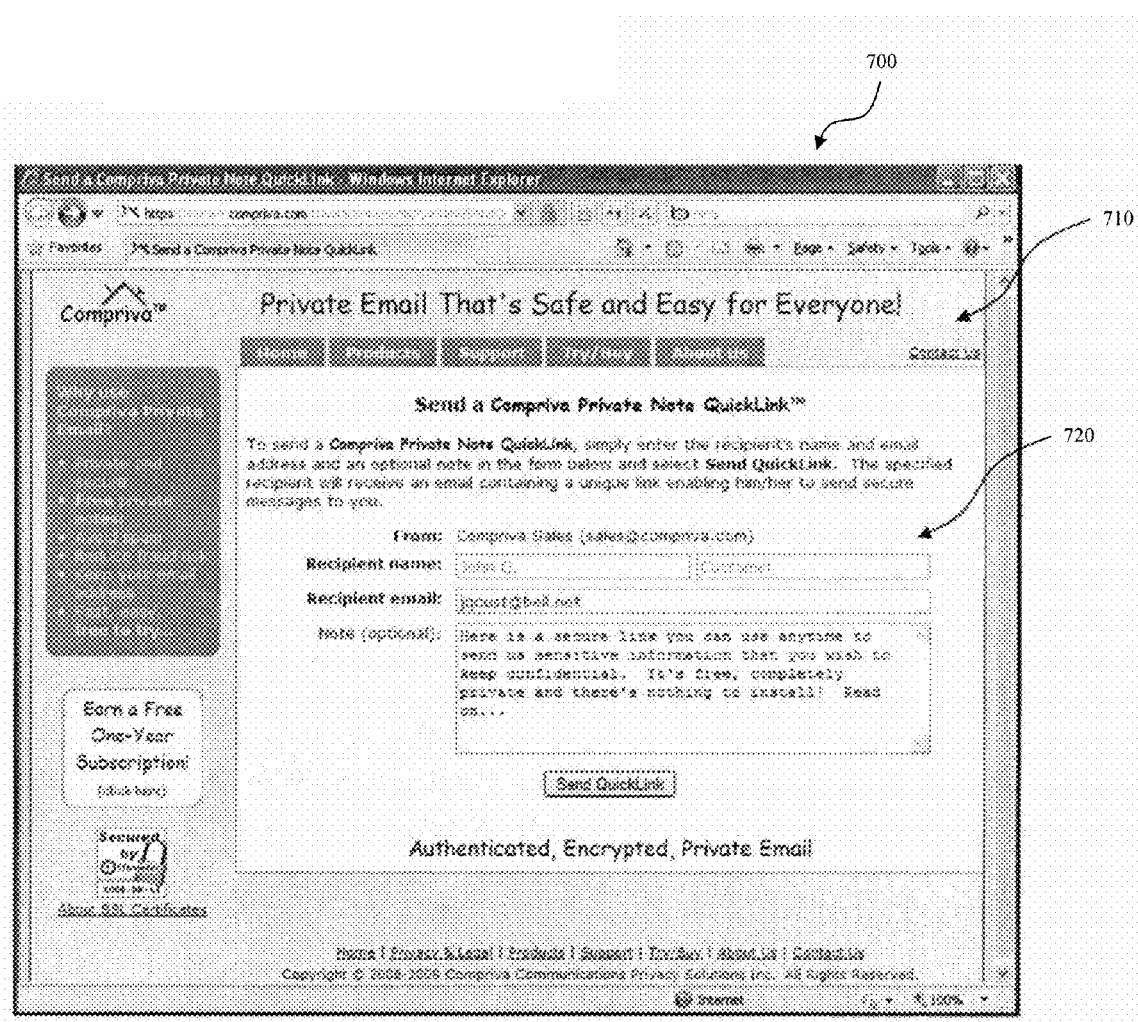
FIG. 7 depicts a screen shot representative of an aspect of an exemplary embodiment of the instant invention.
Figure 8:
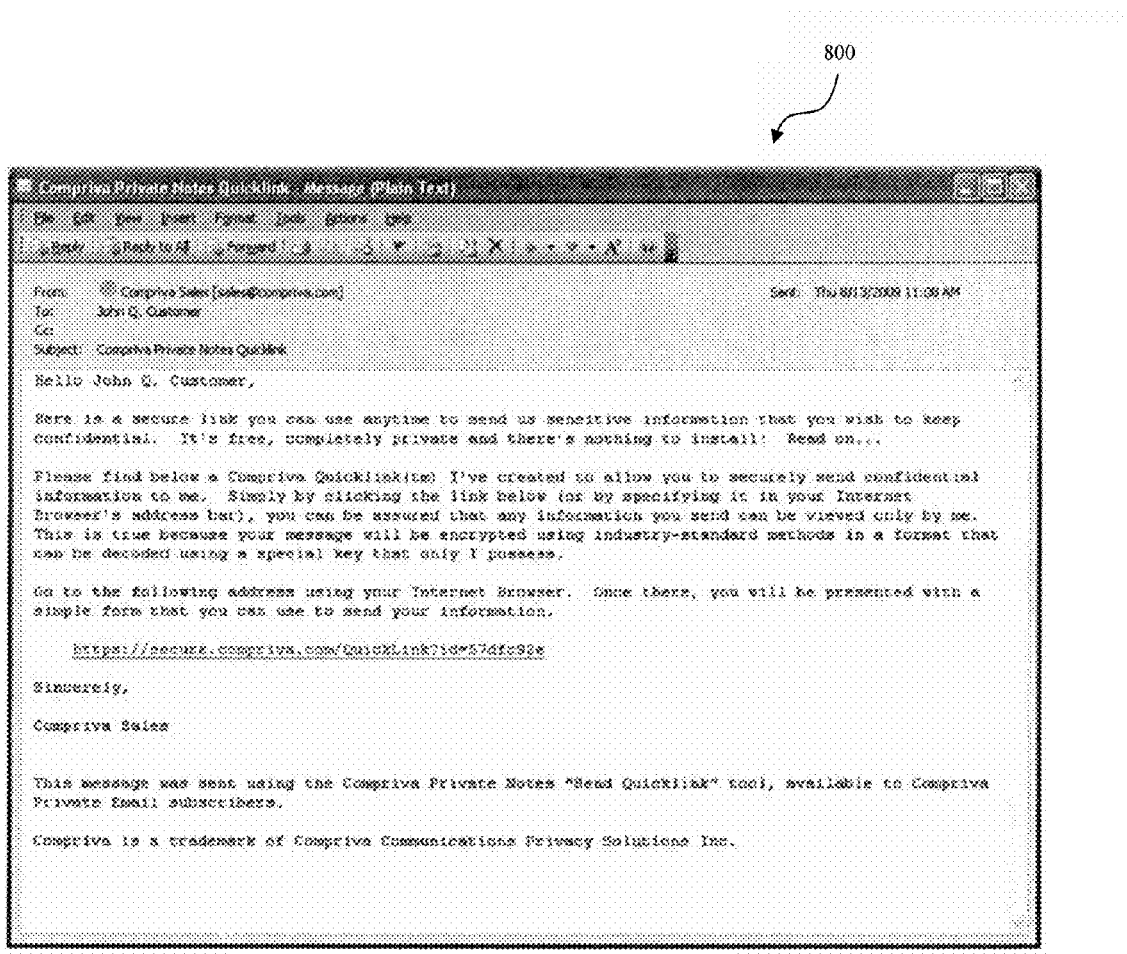
FIG. 8 depicts a screen shot representative of an aspect of an exemplary embodiment of the instant invention.

With reference to FIGS. 7 and 8, there is provided a method and system for securely transferring data on a particular system, exemplary of one embodiment of the instant invention, called Compriva Private Note Quicklink 700. The method comprises the steps of:

1: Authentication of Compriva Subscriber and data sent by Subscriber to Compriva Web Site and request to access the Compriva Web Server to access "Quicklink" Web site 710;
2: Compriva Subscriber specifies non-subscriber's email address and name in a secure "Request Quicklink" form 720 on Compriva Web Site 710;
3: Compriva Subscriber submits "Send Quicklink" form data to Compriva Web Server;
4: Compriva Web Server constructs Compriva Private Note Quicklink URL for recipient and sends to Compriva Email Dispatcher;
5: Compriva Email Dispatcher constructs email message 800 and sends to non-subscriber.

Example 2

Compriva Private Notes

Figure 9:
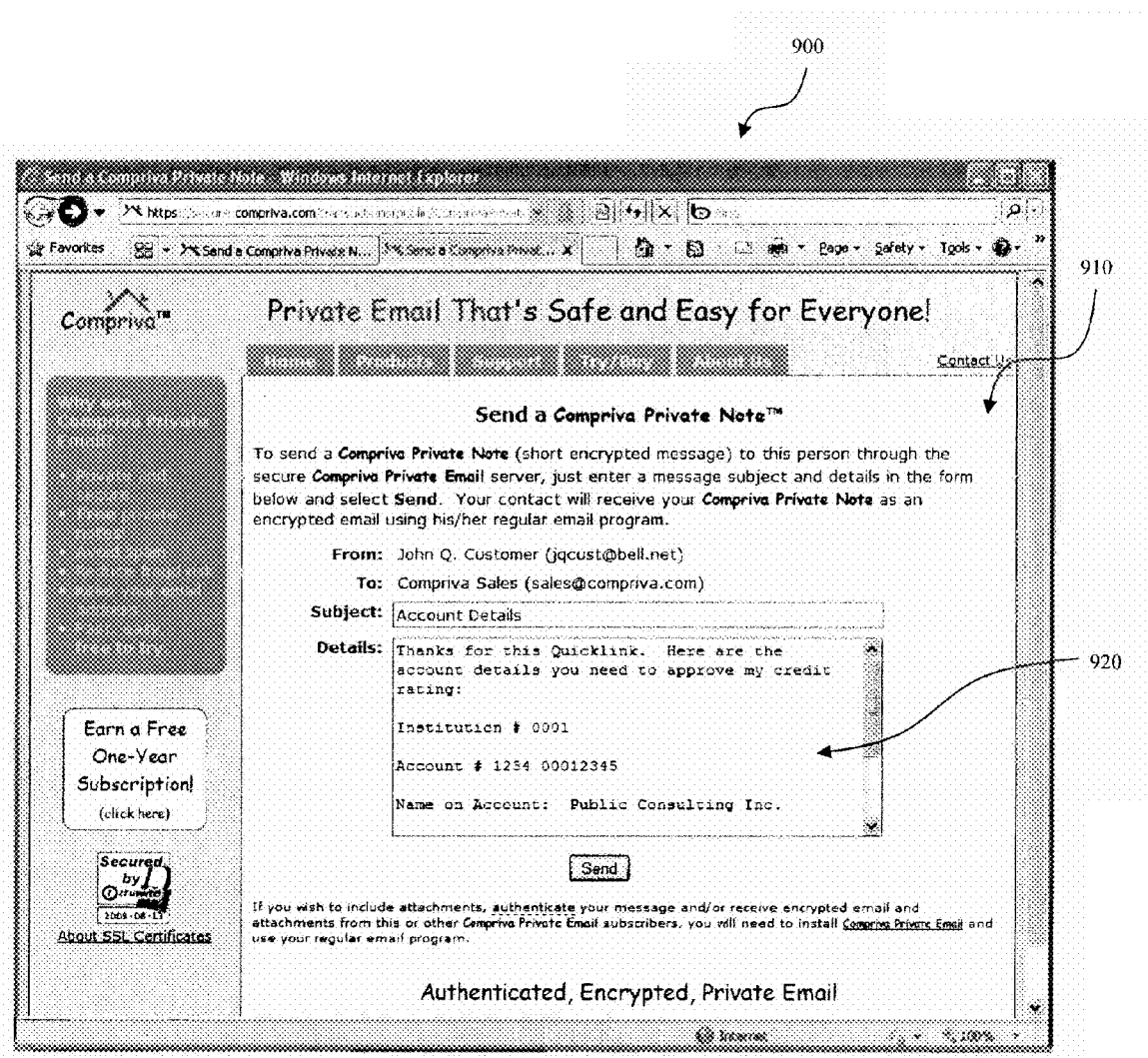
FIG. 9 depicts a screen shot representative of an aspect of an exemplary embodiment of the instant invention.
Figure 10:
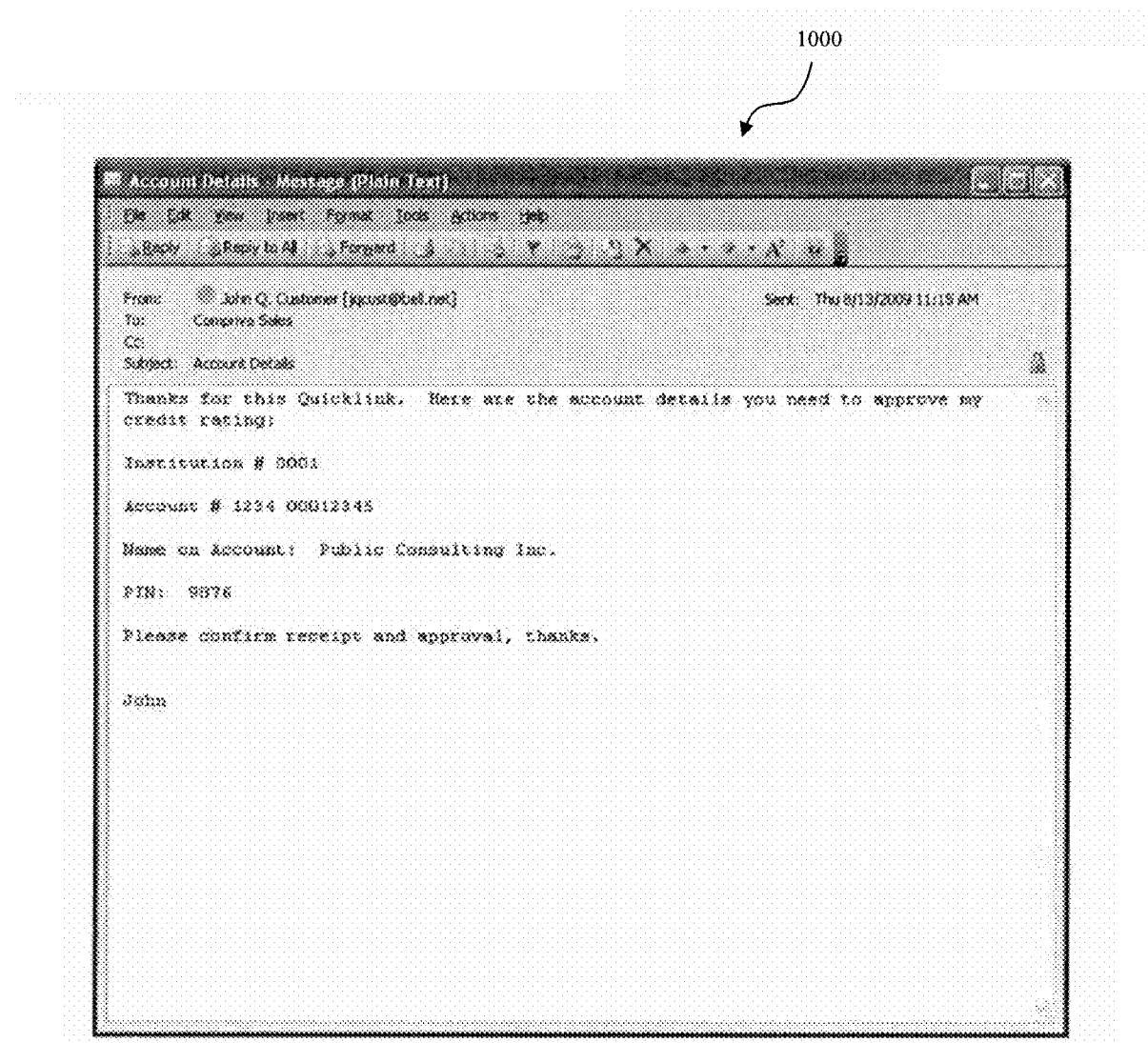
FIG. 10 depicts a screen shot representative of an aspect of an exemplary embodiment of the instant invention.

With reference to FIGS. 9 and 10, there is provided a method and system for securely transferring data on a particular system called Compriva Private Note 900. The method comprises the steps of:

1: Using Compriva Web site 910, Compriva Private Note User (Non-subscriber) selects intended Subscriber of Compriva Private Note to whom the Non-subscriber wishes to send secure data;
2: Compriva Private Note User (non-subscriber) provides note details or uploads data or files to the note using secure form on the Compriva Web Site;
3: Compriva Private Note User (non-subscriber) submits the private note request to the Compriva Web Server (using SSL, TLS, S/MIME or similar encryption);
4: Compriva Web Server sends request to the Compriva Certificate Manager to look up public certificate for the Compriva subscriber (i.e., the intended recipient of the Compriva Private Note);
5: Compriva Web Server sends private note details and subscriber's public certificate to the Compriva Email Dispatcher;
6: Compriva Email Dispatcher encrypts the private note (and accompanying data) using the public certificate (which comprises the public key) and sends the encrypted data to the Compriva subscriber 1000.
7: Optionally, Compriva Subscriber decrypts using private certificate that corresponds to the public certificate from step 4 in accordance with an RSA encryption algorithm;

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention as defined in the appended claims.

We claim:

1. A method of securely transferring data from two or more non-subscribers to a subscriber or a subscriber-defined destination, communicatively linked by a network, the method comprising:
   providing access, to at least one of the two or more non-subscribers, to a predetermined network location indicator;
   establishing a private data transfer conduit accessible via the network location indicator and configured to accept data received from the at least one of the two or more non-subscribers;
   transforming data received by the private data transfer conduit into secured data; and
   transferring the secured data via the network to the subscriber or subscriber-defined destination,
   wherein providing access to the at least one of the two or more non-subscribers to a predetermined network location indicator comprises:
   receiving a private data transfer conduit request from the subscriber, the private data transfer conduit request comprising information relating to the at least one of the two or more non-subscribers; and
   sending a private data transfer conduit notification to the at least one of the two or more non-subscribers, the private data transfer conduit notification comprising the predetermined network location indicator;
   the method further comprising:
   sending a second private data transfer conduit notification to a second at least one of the two or more non-subscribers, the second private data transfer conduit notification comprising a second network location indicator;
   establishing a second private data transfer conduit accessible via the second network location indicator and configured to accept data received from the second at least one of the two or more non-subscribers;
   transforming data received by the second private data transfer conduit into second secured data; and
   transferring the second secured data via the network to the subscriber or subscriber-defined destination.

2. The method of claim 1, wherein the private data transfer conduit request further includes information relating to the subscriber, and wherein the method further comprises authenticating the subscriber based at least in part on the information relating to the subscriber prior to sending the private data transfer conduit notification.

3. The method of claim 1, wherein access to a network location corresponding to the predetermined network location indicator is restricted to a predetermined set of non-subscribers.

4. The method of claim 1, wherein the method further comprises a step of transforming the secured data into unsecured data after the step of transferring the secured data.

5. The method of claim 1, wherein the method further comprises a step of sending a confirmation notification to the at least one of the two or more non-subscribers after the step of transferring the secured data, the confirmation notification comprising information relating to receipt of the secured data by the subscriber or subscriber defined destination.

6. The method of claim 1, wherein said transforming data comprises one or more of: encryption, and separation of data for secure transfer across a private network.

7. The method of claim 1, further comprising generating a network location accessible only to subscribers, the network location configured to facilitate generation of the private data transfer conduit request.

8. The method of claim 1, further comprising managing one or more certificates or keys used in said transforming data.

9. The method of claim 1, wherein data accepted at the private data transfer conduit from the two or more non-subscribers is encrypted data.

10. The method of claim 1, wherein providing access to at least one of the two or more non-subscribers to a predetermined network location indicator comprises placing the predetermined network location indicator on another network location accessible to the at least one of the two or more non-subscribers.

11. The method of claim 1, wherein the data is selected from one or more of text information, data files, streaming audio, streaming video and VOIP data.

12. A system for securely transferring information over a network from two or more non-subscribers to a subscriber or subscriber-defined destination, the system comprising:
  a subscriber computing device communicatively linked to the network;
  two or more non-subscriber devices communicatively linked to the network;
  a server device communicatively linked to the network and configured to provide access, to a first one of the two or more non-subscriber devices, to a predetermined network location indicator, the server device further configured to provide access, to a second one of the two or more non-subscriber devices, to a second predetermined network location indicator;
  a network location corresponding to the predetermined network location indicator; and
  a second network location corresponding to the second predetermined network location indicator;
  a private data transfer conduit accessible via the predetermined network location indicator;
  a second private data transfer conduit accessible via the second network location indicator; and
  a processing and server device operatively coupled to the private data transfer conduit and the second private data transfer conduit and configured to: accept data from the two or more non-subscriber devices, transform the data into secured data, and transfer the secured data to the subscriber or subscriber-defined destination via the network
  wherein the server device is configured to:
  accept a private data transfer conduit request from the subscriber comprising information relating to the first one of the two or more non-subscribers;
  send, upon receipt of said private data transfer conduit request, a private data transfer conduit notification to the first one of the two or more non-subscribers, the notification comprising the predetermined network location indicator;
  accept a second private data transfer conduit request from the subscriber comprising information relating to the second one of the two or more non-subscribers; and
  send, upon receipt of said second private data transfer conduit request, a second private data transfer conduit notification to the second one of the two or more non-subscribers, the notification comprising the second predetermined network location indicator.

13. The system of claim 12, wherein providing access to the two or more non-subscribers comprises placing the predetermined network location indicator on another network location accessible to the non-subscriber.

14. The system of claim 12, wherein the subscriber computing device is configured to transform the transferred secured data into unsecured data.

15. The system of claim 12, wherein the data is selected from one or more of text information, data files, streaming audio, streaming video and VOIP data.

16. A server device communicatively linked to a network configured to facilitate secure transfer of information over a network from two or more non-subscribers to a subscriber or subscriber-defined destination, the server device comprising:
  one or more processors configured to execute computer program modules and a non-transitory computer-readable storage medium operatively coupled to individual ones of the one or more processors, a given processor being configured to generate and process information and handle communications with the server, the non-transitory computer-readable storage medium having instructions recorded thereon for execution by the one or more processors, the server device being configured, at least in part via operation of the one or more processors and the non-transitory computer-readable storage medium, to:
  provide access to at least one of the two or more non-subscribers to a predetermined network location indicator; and
  establish a private data transfer conduit at a network location corresponding to the network location indicator, the private data transfer conduit configured to accept data from a non-subscriber and transform the data into secured data and transfer the secured data to the subscriber or subscriber-defined destination via the network,
  wherein said providing access to the at least one of the two or more non-subscribers comprises:
  accepting a private data transfer conduit request from the subscriber comprising information relating to the at least one of the two or more non-subscribers; and
  sending, upon receipt of said private data transfer conduit request, a private data transfer conduit notification to the at least one of the two or more non-subscribers, the private data transfer conduit notification comprising the predetermined network location indicator, the server device further configured to:
  send a second private data transfer conduit notification to a second at least one of the two or more non-subscribers, the second private data transfer conduit notification comprising a second network location indicator;
  establish a second private data transfer conduit accessible via the second network location indicator and configured to accept data received from the second at least one of the two or more non-subscribers;
  transform data received by the second private data transfer conduit into second secured data; and
  transfer the second secured data via the network to the subscriber or subscriber-defined destination.

17. The server device of claim 16, wherein the private data transfer conduit request further includes information relating to the subscriber, and wherein the server is further configured to authenticate the subscriber based at least in part on the information relating to the subscriber prior to sending the private data transfer conduit notification.

18. The server device of claim 16, wherein access to a network location corresponding to the predetermined network location indicator is restricted to a predetermined set of non-subscribers.

19. The server device of claim 16, the server device further configured to send a confirmation notification to the at least one of the two or more non-subscribers after the step of transferring the secured data to the subscriber, the confirmation notification comprising information relating to receipt of the secured data by the subscriber.

20. The server device of claim 16, wherein said transforming data comprises one or more of: encryption, and separation of data for secure transfer across a private network.

21. The server device of claim 16, further configured to generate a network location accessible only to subscribers, the network location configured to facilitate generation of the private data transfer conduit request.

22. The server device of claim 16, further configured to manage one or more certificates or keys used in said transforming data.

23. The server device of claim 16, wherein data accepted at the private data transfer conduit from the at least one of the two or more non-subscribers is encrypted data.

24. The server device of claim 16, wherein providing access to at least one of the two or more non-subscribers comprises associating the predetermined network location indicator with another network location accessible to the at least one of the two or more non-subscribers.

25. The server device of claim 16, wherein the data is selected from one or more of text information, data files, streaming audio, streaming video and VOIP data.

26. A computer program product comprising a non-transitory computer-readable medium having recorded thereon code which, when loaded into memory and executed on a processor of a computing device, is adapted to securely transfer data from two or more non-subscribers to a subscriber or a subscriber-defined destination communicatively linked by a network, including:

providing access, to a first one of the two or more non-subscribers, to a predetermined network location indicator;

providing access, to a second one of the two or more non-subscribers, to a second predetermined network location indicator;

establishing a private data transfer conduit accessible via the network location indicator and configured to accept data received from the first one of the two or more non-subscribers;

establishing a second private data transfer conduit accessible via the second network location indicator and configured to accept data received from the second one of the two or more non-subscribers;

transforming data received by the private data transfer conduit into secured data;

transforming data received by the second private data transfer conduit into second secured data;

transferring the secured data via the network to the subscriber or subscriber-defined destination;

transferring the second secured data via the network to the subscriber or subscriber-defined destination;

wherein providing access to the two or more non-subscribers to a predetermined network location indicator comprises:

receiving a private data transfer conduit request from the subscriber, the private data transfer conduit request comprising information relating to the first one of the two or more non-subscribers;

sending a private data transfer conduit notification to the first one of the two or more non-subscribers, the private data transfer conduit notification comprising the predetermined network location indicator;

receiving a second private data transfer conduit request from the subscriber, the second private data transfer conduit request comprising information relating to the second one of the two or more non-subscribers; and sending a second private data transfer conduit notification to the second one of the two or more non-subscribers, the second private data transfer conduit notification comprising the second network location indicator.

27. The computer program product of claim 26, wherein the data is selected from one or more of text information, data files, streaming audio, streaming video and VOIP data.

* * * * *